United States Patent [19]

Krampe

[11] Patent Number: 4,557,164
[45] Date of Patent: Dec. 10, 1985

[54] WIRE AND CABLE STRIPPING DEVICE

[76] Inventor: Josef Krampe, Bergstrasse 5, 4715 Ascheberg-Herbern, Fed. Rep. of Germany

[21] Appl. No.: 551,823

[22] Filed: Nov. 10, 1983

[30] Foreign Application Priority Data

Nov. 10, 1982 [DE] Fed. Rep. of Germany ....... 3241530

[51] Int. Cl.⁴ .............................................. H02G 1/12
[52] U.S. Cl. .................................................. 81/9.41
[58] Field of Search .................... 81/9.5, 416; 30/90.1, 30/91.1, 91.2

[56] References Cited

U.S. PATENT DOCUMENTS 1,162,141 11/1915 Arment ................................. 81/416
4,341,134 7/1982 Yamazaki et al. ................. 81/9.5 A Primary Examiner—James G. Smith
Assistant Examiner—Debra S. Meislin
Attorney, Agent, or Firm—Michael J. Striker

[57] ABSTRACT

A wire stripping plier has two crossing pivotable arms with hand grips and gripping jaws for gripping the insulation to be stripped from the wire. Two opposing stripping members are provided in the plier, which member can be longitudinally displaced one relative to another upon the pivoting movement of the hand grips towards each other after the insulation has been severed from the wire. Due to this longitudinal displacement the severed insulation is stripped from the wire.

13 Claims, 10 Drawing Figures

WIRE AND CABLE STRIPPING DEVICE

BACKGROUND OF THE INVENTION

The present invention pertains to an insulation removing device. More particularly, this invention relates to a device for stripping insulation from wires and cables.

There are known devices for stripping insulation from wires and cables. Conventional devices of the type under consideration comprise two crossing hand grips which are pivotable with respect to each other and carry at the ends thereof gripping jaws and stripping members which cooperate with each other when the grips are pivoted towards one another to produce a cut on the insulation and strip the latter from the wire.

One of such stripping devices is disclosed in the applicant's U.S. Pat. No. 3,516,307.

The known devices of the type under discussion are formed as pliers. Such a plier is comprised of a plurality of cooperating individual components which form a mechanism carrying out the severing and the stripping of the insulation. These individual components must be more or less precisely fabricated and assembled. This involves considerable expenses. Furthermore, high requirements have been established to the functions of the components of the plier because during the clamping of the insulation, severing it and stripping it from the wire, the wire itself can be damaged. The damaged wire, however can break or can be subjected to corrosion and therefore can not be used.

SUMMARY OF THE INVENTION

It is an object of the present invention to provide an improved wire and cable stripping device.

It is a further object of the invention to provide an insulation stripping plier which would include a minimum number of components necessary for carrying out its function.

It is still another object of the invention to provide a cable stripping plier, which is inexpensive to produce and which allows to save materials and time for its production.

These and other objects of the invention are attained by a wire and cable stripping device, comprising two complementary arms each having at one end a handle portion and at the other end a jaw portion carrying a gripping jaw; pivot means pivotally connecting said arms intermediate the respective ends thereof for movement about a pivot axis normal to the elongation of said arms, the gripping jaws being operative for gripping an insulated wire to be stripped in response to the movement of said jaw portions towards each other; and two opposing stripping members provided on the respective jaw portions and operative for severing the insulation on the wire, one of said stripping members being displaceable with respect to another stripping member and longitudinally thereof in response to a further movement of said jaw portions towards each other for stripping the insulation from the wire.

The stripping members may be rigidly mounted on the respective jaw portions, whereby the stripping of the insulation from the wire after the insulation has been severed from the wire results when said jaw portions are closed by said hand portions and upon a mutual displacement of the jaw portions longitudinally of each other caused by said further movement.

Each of said arms may have an intermediate portion between the jaw portion and the handle portion, the intermediate portion of one arm being formed with a recess through which another arm passes.

Each of the arms may be formed in the region of the intermediate portion thereof with an oblong opening, the oblong openings of two arms being connected with each other.

The above mentioned pivoting means may include a cylindrical pin located in said oblong openings and forming a mutual pivot axis for said arms.

The cable stripping device according to the invention may include spring means permanently tending to bias said arms against their movement towards each other, said displacement causing said pin to be displaced in said oblong openings against the force of said spring means, a path of the displacement of said pin corresponding to the sum of the lengths of said oblong openings minus the diameter of said pin.

According to another concept of the present invention the device may further comprise an extension piece rigidly connected to one of said gripping jaws, the mutual displacement of said jaw portions upon said further movement of said handle portions towards each other resulting in that, after the insulation has been severed from the wire, one of said jaw portions moves relative to said one gripping jaw and said extension piece in the direction towards said cylindrical pin whereby said pin slides in said oblong openings to an outermost position and said one stripping member is dragged by said one jaw portion to strip the insulation from the wire.

The spring means may be a spiral spring.

The device according to the invention may further include a centering element mounted between the intermediate portions of said arms.

The spiral spring may be wrapped around said centering element and have two spread end portions extended towards the respective handle portions of the device.

According to still a further concept of the invention the cable stripping device may include a roller arranged in one of said hand portions, one of the spread end portions of the spring having a bent end slidable over said roller.

The device may further comprise a connecting element mounted on said centering element, said connecting element being operatively connected to said extension piece.

The connecting element may have a projecting finger at one side thereof and a plate-like portion at another side thereof, said plate-like portion having an opening through which said centering element extends.

The stripping members each may have an angular recess forming a cutting edge, said stripping members overlapping each other in a shearing-like fashion when they severe the insulation from the wire.

One of the gripping jaws may be formed with a projection in the region of the recess of the respective stripping member, said projection protruding from said one jaw a distance corresponding to the thickness of the insulation to be stripped from the wire.

The device according to the invention may further include cutting elements for cutting off the wire and arranged on the jaw portions of the arms opposite to each other.

The novel features which are considered as characteristic for the invention are set forth in particular in the appended claims. The invention itself, however, both as to its construction and its method of operation, together

DETAILED DESCRIPTION OF THE PREFERRED EMBODIMENT

Figure 1:
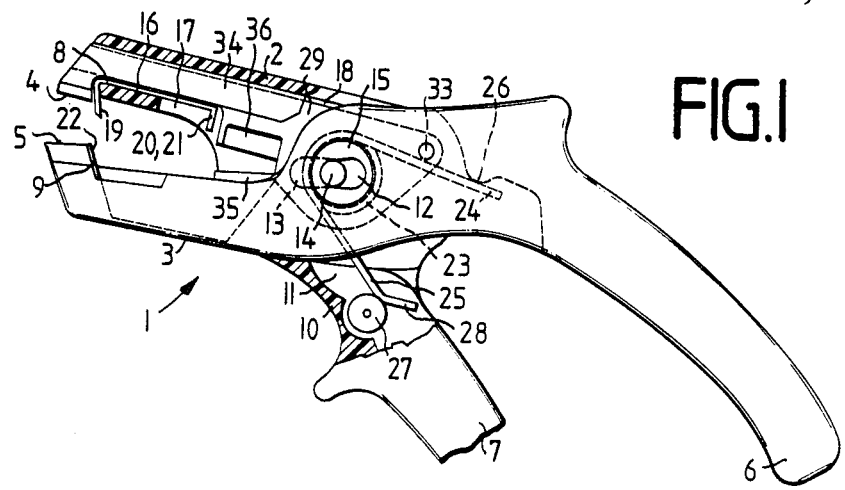
FIG. 1 is a side view, partially in section, illustrating a cable stripping device according to the invention, in an initial position.

Referring now to the drawings, and firstly to FIG. 1 thereof, which shows the wire and cable stripping device in an initial position, it will be seen that the device is generally a plier 1, which has two complementary crossing arms 2 and 3 provided with respective gripping jaws 4 and 5 and two handle portions 7 and 6, respectively. Two stripping members 8 and 9, each having a V-shaped cutting edge, are provided on the arms 2 and 3 beneath the respective jaws 4 and 5. The handle portion 6, plier arm 3 and gripping jaw 5 are integral with each other whereas the handle portion 7 is integrally formed with an intermediate portion 10 and the plier arm 2. Handle portion 7 in said intermediate portion 10 is provided with a uniform recess 11 through which the handle portion 6 passes. Both handle portions 6 and 7 are hollow; in other words they are double-walled with an interspace closed between the walls; outer surfaces of the handle portions serve for manipulation by a hand of the operator. The interspace within the handle portions serves for accommodating the required movable and stationary components of the mechanism of the plier as clearly shown in FIGS. 9 and 10.

Figure 4:
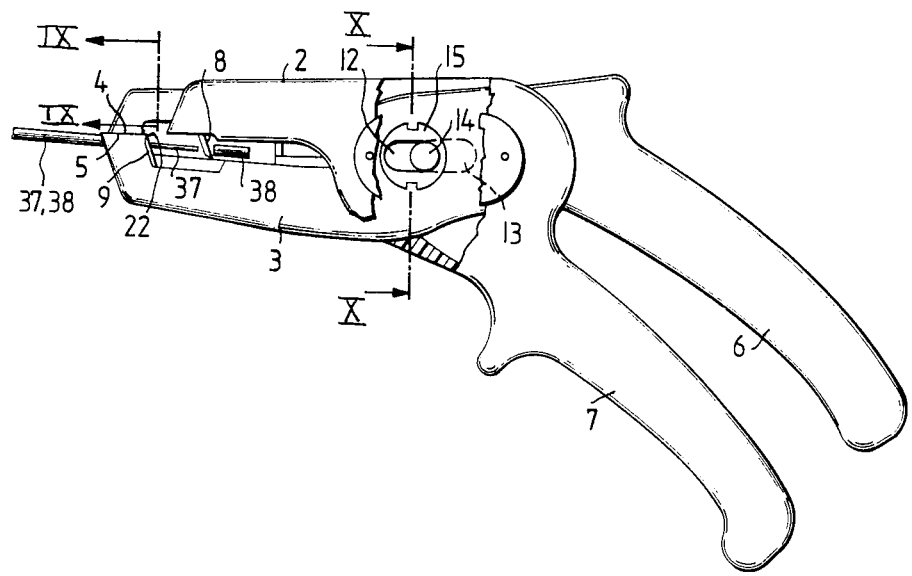
FIG. 4 is a side view of the device of FIG. 1 in the position after the stripping of the severed insulation from the wire has been made.
Figure 9:
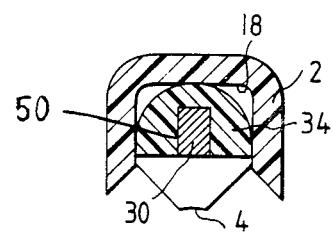
FIG. 9 is a sectional view along line IX—IX of FIG. 4.
Figure 10:
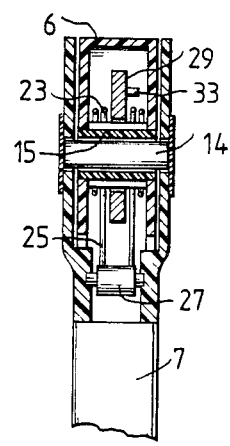
FIG. 10 is a sectional view along line X—X of FIG. 4.

Both handle portions or grips 6 and 7 are formed with oblong openings 12 and 13 into which a common cylindrical pin 14 is loosely inserted, which forms a common pivot axis of the grips so that the grips may be turned about that pivot axis which extends normal to their elongation. Pin 14 is movable back and forth in oblong openings 12, 13 transversely to the elongation of the arms upon a corresponding movement of the arms 2 and 3. As shown in FIGS. 4, 9 and 10, a cylindrical sleeve-like centering element 15 is mounted in the interspace of the double-walled handle portion 6, oblong opening 12 passing through the centering element 15 whereby the latter extends through the above pivot axis. The centering element is inserted through a respective bore formed in arm 3 or handle portion portion 6 and is secured in the space between the walls thereof against rotation.

Figure 5:
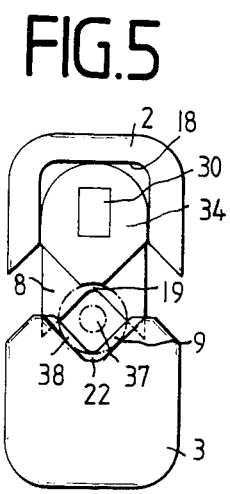
FIG. 5 is a front view of the gripping jaws of the device.

The arm 2 of the handle portion 7 has, in the region of connection with the intermediate portion 10, an additional inner wall 16 which is formed with a slot 17 whereby arm 2 forms in the region of slot 17 a channel 18 as also seen in FIGS. 5 and 9.

Figures 6, 7:
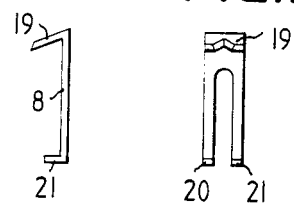
FIG. 6 is a side view of the stripping member.
FIG. 7 is a front view of the stripping member of FIG. 6.

Opposing jaws 4 and 5 are formed so as to receive therebetween an end of the wire to be stripped. The gripping jaw 5 has a V-shaped configuration whereas the gripping jaw 4 is formed so that it registers with the shape of jaw 5. As will be seen from FIGS. 5 through 7, a stripping member 9 is mounted immediately on the lower side of the gripping jaw 5, the stripping member 9 being rigidly arranged in the arm 3. An opposing stripping member 8 is arranged in the arm 2 and lies behind the inner wall 16 as shown in FIG. 1. Member 8 has at one end a cutting tip 19 which abuts against the inner wall 16 and at the other end two bent end portions 20 and 21 spaced from each other as seen in FIGS. 6 and 7. End portions 20 and 21 of the cutting member 8 protrude along the side walls forming the slot 17.

The stripping member 9 has a V-shaped recess and in the region of said recess insignificantly projects over the V-shaped recess of the gripping jaw 5 whereby a projection 22 shown in FIGS. 4 and 5 is formed; the insulation 38 is held and supported on this projection in jaws 4, 5 after the insulation has been severed from the wire and a stripping of the insulation from the wire takes place as can be seen in FIG. 4.

Two handle portions 6 and 7 and arms 2 and 3 therewith are held in the initial position shown in FIG. 1 by means of a spiral spring 23 having two spread portions 24 and 25. The spiral portion of the spring is concentrically positioned around the centering sleeve-like element 15 (FIG. 10) whereas the spread end portion 24 is supported by a spring force on projection 26 formed on the hand portion 6 and another spread portion 25 is supported by the spring force against a roller 27 provided in the hand portion 7 (FIGS. 1 and 10). Particularly, an end piece 28 of the spring end portion 25 which is bent in the region of roller 27 can bear against the latter. Roller 27 as seen from FIG. 10 is supported between the walls of handle portion 7. It is understandable that the hollow interspace between the walls of the handle portions is U-shaped.

Figure 8:
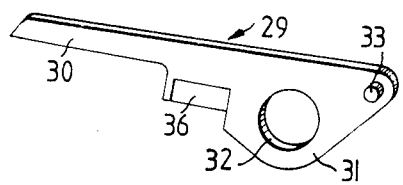
FIG. 8 is a side view of a connecting element.

An intermediate element 29 is arranged in the middle between the hand portion 6 and the arm 3. This element is shown in detail in FIG. 8. The element 29 is formed with an extension or finger 30 at one side thereof and with a plate-like section 31 at the other side. The plate-like section 31 is formed with an opening 32 and with a further opening for receiving therein a pin 33 which operates as a stop for the spring end portion 24 in the initial position of the plier as shown in FIG. 1.

With reference to FIG. 10 it is seen that intermediate element 29 is mounted on the centering element 15 which is received in the opening 32 with a play so that intermediate element 29 can slide on element 15 and pivot thereabout within a required pivoting range. Finger 30 of element 29 extends into the channel 18 of arm 2 so that it is connected with the gripping jaw 4 via an extension piece 34. The extension piece 34 has a cross-section which is adjusted to that of the channel 18 formed by the wall of arm 2 whereby extension piece 34 can slide in the channel 18. As seen in FIG. 9 finger 30 of intermediate element 29 extends into a longitudinal recess 50 provided in the extension piece 34 in which finger 30 is engaged so that extension piece 34 can slide over finger 30.

Two opposing cutters 35 and 36 serve for cutting the wire off when the hand portions 6, 7 of the plier are pressed together.

The mode of operation of the stripping device according to the invention is as follows:

In the initial position shown in FIG. 1 arms 2 and 3 of the plier are open for an insertion therebetween of the end of the wire 37 with the insulation 38 thereon.

Figure 2:
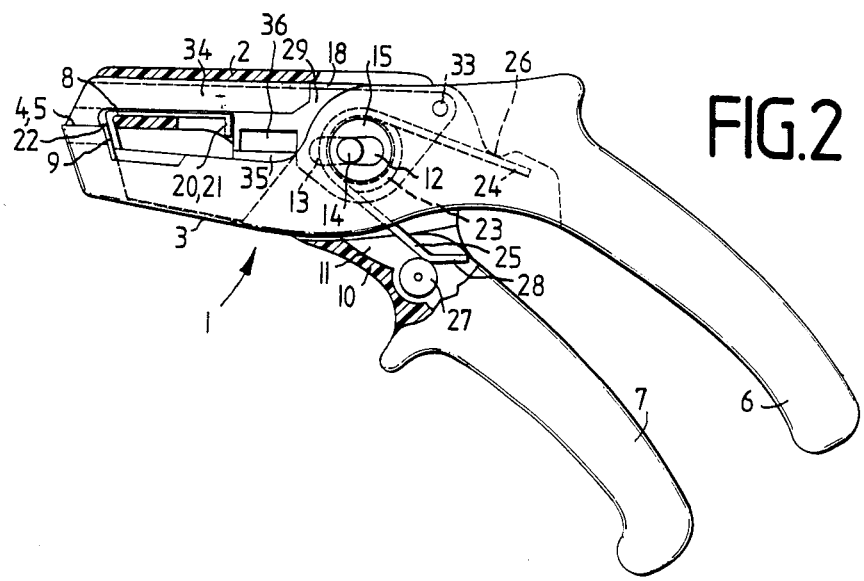
FIG. 2 is a side view, partially in section of the device of FIG. 1 in the insulation-severing position thereof.
Figure 3:
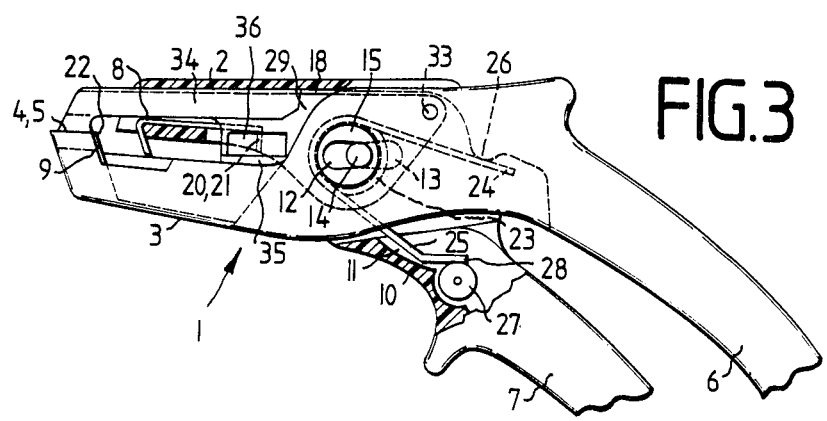
FIG. 3 is a side view of the device of FIG. 1 but in the stripping and end position.

As pressure is exerted on the handle portions 6, 7 in the sense of moving these handle portions toward each other, the jaws 4 and 5 will similarly move towards one another. Thus the gripping jaws 4 and 5 will engage on the insulated wire 38 located therebetween. The insulated wire, however, will not be clamped between the gripping jaws 4 and 5. Simultaneously, stripping members 8, 9 move one over another in a shearing-like fashion as can be seen in FIG. 2; V-shaped recessed cutting edges of stripping members 8, 9 cut into the insulation 38 at two opposite sides thereof. The depth of the cut, which is limited by overlapping of the stripping members 8, 9, is such that no damage to the wire can be done. Still further movement of the handle portions 6, 7 towards each other will result in stripping of the severed insulation 38 from the wire due to the longitudinal displacement of the closed plier arms 2, 3 and handle grips 6, 7 as can be seen in FIGS. 3 and 4.

In the initial position shown in FIG. 1, prestressed end portions 24 and 25 of the spiral spring 23 press against the roller 27, projection 26 and pin 33, respectively. When handle portions 6 and 7 are moved towards each other, end portions 24, 25 of the spring at the same time move towards each other due to the tension of spring 23 whereby pin 33 and intermediate connecting element 29 therewith will be released as shown in FIG. 2. The insulation 38 of the wire is, in this position of the plier, severed from the wire.

Upon a continued application of the pressure to the handle portions 6, 7, the bent end piece 28 of the spring end portion 25 slides over the roller 27 in the jerk-like manner, whereby simultaneously the arm 2 which engages the severed insulation 38, is, due to the its rigid connection with the element 29 and the centering element 15, and together with the stripping member 8 rigidly connected thereto, longitudinally displaced relative to the opposing arm 3 towards the crossing point while cylindrical pin 14 is dragged in the oblong opening 13.

The path of this displacement corresponds to the whole length of both oblong openings 12, 13 minus the diameter of the cylindrical pin 14. When handle portions 6, 7 are released, due to releasing of the spiral spring 23, these portions 6 and 7 open up to a transition point. A complete opening of handle portions 6 and 7 and thus the plier takes place afterwards by a rapid opening of arms 2, 3 independently through the force of the spring 23.

It will be understood that each of the elements described above, or two or more together, may also find a useful application in other types of cable strippers differing from the types described above.

While the invention has been illustrated and described as embodied in a wire and cable stripping device, it is not intended to be limited to the details shown, since various modifications and structural changes may be made without departing in any way from the spirit of the present invention.

Without analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wire and cable stripping device, comprising two complementary arms each having at one end a handle portion and at the other end a jaw portion carrying a gripping jaw; pivot means including a cylindrical pin pivotally connecting said arms intermediate the respective ends thereof for movement about a pivot axis of said pin extended normal to an elongation of said arms, said jaw portions being movable towards each other by said handle portions so as to move the gripping jaws towards an insulated wire to be stripped and grip a wire; two opposing stripping members rigidly mounted on respective jaw portions to move therewith for severing the insulation on a wire when said gripping jaws grip a wire, each of said arms having an intermediate portion between the jaw portion and the handle portion and being formed at said intermediate portion with an oblong opening, the oblong openings of two arms being connected with each other and accommodating said cylindrical pin which is slidably positioned therein; a centering element mounted between the intermediate portions of said arms for centering said cylindrical pin; an intermediate connecting element pivotally mounted on said centering element for connecting said centering element to one of said gripping jaws; an extension piece for connecting one of said gripping jaws to said intermediate connecting element; and a multi-stage spring wrapped around said centering element and having two spread end portions extended towards the respective handle portions and cooperating therewith to press said arms against each other to permit a displacement of said arms and thus said opposing stripping members relative to each other in said direction of elongation and a step-like pivotal movement of said arms relative to each other against a force of said spring, whereby, after severing the insulation on a wire, one of said arms with one of said stripping members is displaced relative to the other of said arms with the other stripping member in said direction of elongation in response to a further movement of said jaw portions towards each other so as to strip the insulation from the wire.

2. The device as defined in claim 1, wherein the intermediate portion of one arm is formed with a recess through which the other arm passes.

3. The device as defined in claim 2, further including a roller arranged in one of said handle portions, one of the spread end portions of the spring having a bent end slidable over said roller.

4. The device as defined in claim 3, wherein said intermediate connecting element has a projecting finger at one side thereof and a plate-like portion at another side thereof, said plate-like portion having an opening through which said centering element is extended, said extension piece being connected to said projecting finger.

5. The device as defined in claim 4, wherein said stripping members each has an angular recess forming a cutting edge, said stripping members overlapping each other in a shearing-like fashion when they sever the insulation from the wire.

6. The device as defined in claim 5, wherein one of said gripping jaws is formed with a projection in the region of the recess of the respective stripping member, said projection protruding from said one jaw a distance corresponding to the thickness of the insulation to be stripped from the wire.

7. The device as defined in claim 6, further including cutting elements arranged on said jaw portions opposite to each other.

8. A wire and cable insulation stripping device, comprising two complementary arms each including a hand portion and a jaw portion carrying a gripping jaw; said arms being movable towards each other to close the gripping jaws on a wire; two opposing insulating stripping members each rigidly mounted on a respective jaw portion, each of said arms having an intermediate portion between the jaw portion and the handle portion, the intermediate portion of one arm being formed with a recess through which the other arm passes; the intermediate portion of each arm being formed with an oblong opening and the oblong openings of both intermediate portions being connected to each other; a cylindrical pivot pin slidably positioned in said oblong openings and forming a mutual pivot-and-displacement point for said two arms; a centering element mounted between the intermediate portions of said arms, for centering said cylindrical pivot pin one of said oblong openings passing through said centering element; an intermediate connecting element pivotally mounted on said centering element for connecting said centering element to one of said gripping jaws; an extension piece for connecting one of said gripping jaws to said intermediate connecting element; a spiral spring concentrically wrapped around said centered element and having two spread end portions; and a roller arranged in one of said handle portions, the other of said handle portions having an inner projection, one of said spread end portions of the spring having a bent end slidable over said roller and the other spread end portion of the spring being supported against said projection, said spiral spring pressing said arms towards each other so that said arms with respective stripping members are displaceable relative to each other in a direction of elongation of the jaw portions and said arms are pivotable relative to said pin in a step-like fashion against a force of said spring, whereby said jaws are pressed against each other in a step-like fashion in response to a pivotal movement of said arms to each other and said stripping members are brought to a cutting position in response to a further pivotal movement of said arms towards each other to cut the insulation on a wire, and upon a displacement of one arm relative to the other arm in said direction of elongation the one stripping member is displaced relative to the other stripping member and strips the insulation from the wire.

9. The device as defined in claim 8, further including said intermediate connecting element having an opening through which said centering element passes and including a projecting finger at one side thereof and a plate-like portion at the other side thereof, said plate-like portion having a pin which forms an additional stop for said other spread end portion of the spring.

10. The device as defined in claim 9, further including said extension piece for connecting one of said gripping jaws to said projecting finger.

11. The device as defined in claim 10, wherein each stripping member has an angular recess forming a cutting edge, said stripping members in said cutting position overlapping each other in a shearing-like fashion.

12. The device as defined in claim 11, wherein the angular recess of one stripping member projects over the angular recess of the other stripping member when the stripping members are in the cutting position.

13. The device as defined in claim 12, further including cutting elements arranged on said jaw portions opposite to each other.

* * * * *